Oct. 29, 1968  J. A. WOODEN ET AL  3,407,882

RESILIENT FAN HUB

Filed Nov. 19, 1965

INVENTORS.
JOHN A. WOODEN and
RONALD D. QUINLAN

BY *Jackson, Woodard, Smith & Weibert*

Attorneys

United States Patent Office 3,407,882
Patented Oct. 29, 1968

3,407,882
RESILIENT FAN HUB
John A. Wooden and Ronald D. Quinlan, Indianapolis, Ind., assignors to Brookside Corporation, Cordville, Ind., a corporation of Indiana
Filed Nov. 19, 1965, Ser. No. 508,806
6 Claims. (Cl. 170—160.54)

This invention relates generally to vibration isolating absorbing or isolating devices such as fan mountings and in particular to a resilient hub which provides a snap-in mounting for a fan spider on its drive shaft.

Various fasteners and hub devices, some providing resilient connections, have been used in the past for providing the drive connection between a fan spider and its power shaft. One highly desirable feature for such devices is the capability for convenient installation at the job, that is, joining the fan spider to the drive motor shaft at the point of use of the fan. Use of a hub having this feature can drastically reduce packaging costs and handling damage as compared to hubs which require pre-mounting on the drive shaft and thus necessitate shipping the complete assembly as a unit. The hub structure of the present invention provides this feature.

The hub structure of the present invention, being somewhat flexible in a plane normal to the axis of rotation, tends to isolate and absorb torsional vibration moving from the shaft to the fan blades carried by the fan spider and cuts off vibration pulses from the fan or driven device back to the driving shaft. Torsional vibration, induced by the A.C. input pulses to the drive motor, is always present in A.C. motor driven fans and it is highly desirable that such vibration be isolated from the fan itself. The fan hub of the present invention, utilizing constant stress members having a controllable amount of flexibility in a plane normal to the axis of rotation functions to isolate torsional vibration of the drive shaft from the fan blades. This isolation, or prevention of transmission of vibration through the hub, is of the predominant torsional frequencies from the drive shaft and is accomplished by forming the hub so that the torsional spring constant (force-deflection ratio) of the hub is low enough with relation to the moment of inertia of the fan or driven member so as to cause the natural frequency of the fan or driven member to be substantially lower than the natural torsional vibration frequency of the drive shaft. The material from which the hub is fabricated can be varied so as to absorb, by converting to internal frictional heat, the work input to the hub elastic system under conditions where the vibration frequency of the source might be in damaging resonance with the natural frequency of the fan, or driven member. The fan hub of the present invention, further, because of its configuration and gripping action on the fan spider, can accommodate a relatively large range of variation in thickness of the fan spider. The hub can thus be used with fan spiders fabricated from stock of relatively widely varying thickness.

It is the primary object of the present invention to provide a hub or coupling device for utilization between a driving and driven member having the snap-on and vibration isolating features referred to above.

A further object of the present invention is to provide a resilient fan hub utilizing constant stress cantilever beam elements to grip the fan spider.

A further object of the present invention is to provide a fan hub having radially extending flexible arms which have portions engaging the fan spider to limit or snub extreme deflection of the arms upon abnormal overloading.

These and other objects will become apparent as the description proceeds with reference to the accompanying drawings in which.

Figure 1:
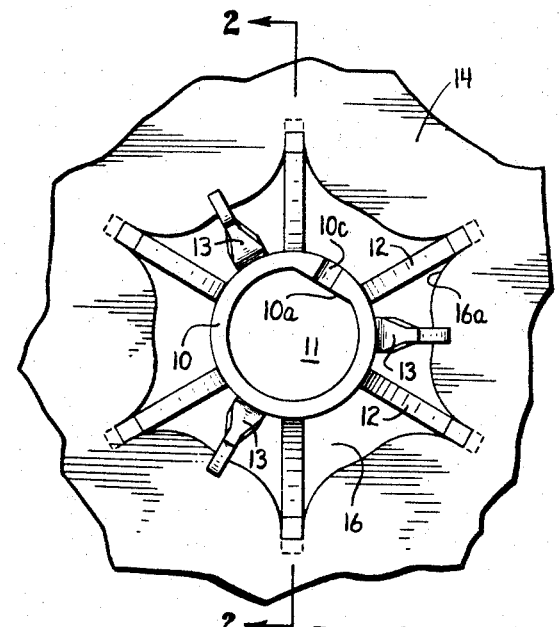
FIG. 1 is an end view of a fan hub embodying the present invention and showing a portion of the fan spider mounted by the hub.

Referring to the drawings, the resilient hub of the present invention comprises a sleeve portion 10 which is flattened along one inner surface, as indicated at 10a, and is thus rotationally locked to a drive shaft 11 which is rotated by a drive motor or similar driving means (not shown). Extending radially outwardly from the sleeve is a series of equally spaced arms 12, the profile configuration of the arms being shown in FIG. 2. At the outer ends of each of the arms there is formed an abutment 12a.

Figure 3:
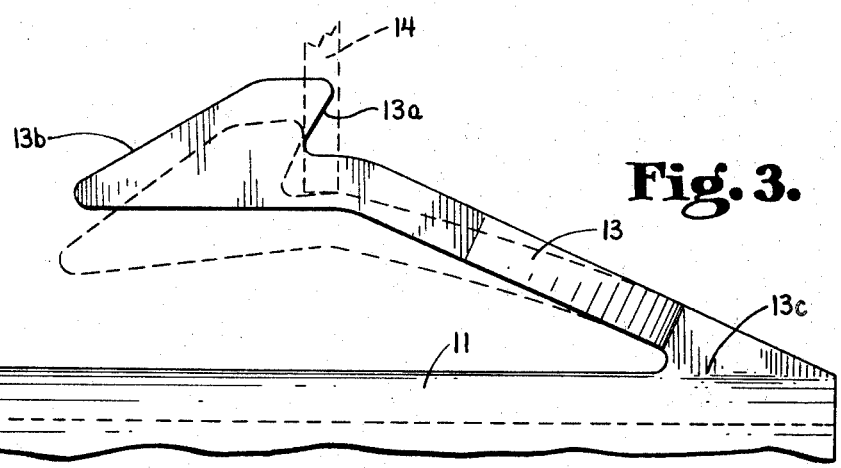
FIG. 3 is an enlarged fragmentary view showing the fan spider engaging legs.
Figure 4:
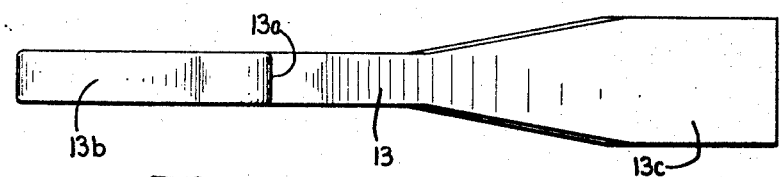
FIG. 4 is a top plan view of the fan spider engaging leg shown in FIG. 3.

Also extending from the outer surface of the sleeve portion 10 of the hub are three legs 13. The legs 13 extend from the hub portion at an acute angle therewith as will be evident from FIG. 3. Each of the legs 13 is provided with an abutment 13a, the abutment being undercut with relation to the outer margin of the leg as will be evident from FIG. 3. The free ends of the legs present an inclined surface 13b to an element such as a fan spider which is to be slipped over the hub as will be subsequently described. The legs 13, as will be evident from FIG. 4, have a diminishing cross-sectional area from their junction 13c with the sleeve toward their free ends. The legs, when stressed or deformed radially inwardly are thus uniformly stressed along a substantial portion of their length.

Figure 2:
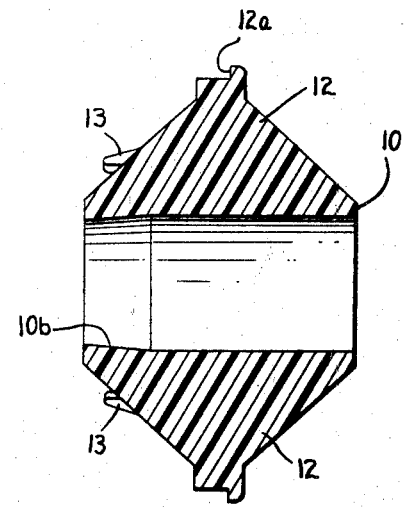
FIG. 2 is a side view, partially in section and taken generally along the line 2—2 of FIG. 1.

The central aperture through the sleeve portion of the hub 10 is provided with a slight inward taper as indicated at 10b in FIG. 2. This tapered portion serves to effectively grip the driving shaft and insertion of the sleeve portion on the shaft or movement of the hub along the shaft may be accomplished by inserting a tool such as a screw driver into the slot 10c (FIG. 1), thereby spreading the end of the hub somewhat and permitting the sleeve portion to be shifted upon the shaft 11.

The hub is preferably formed of a somewhat resilient material having appreciable internal friction, such as monopolymer acetyl thermoplastic or the like and is adapted to support a driven element such as a fan spider, a portion of a fan spider being shown at 14 in FIG. 1. It will be understood that other materials than that specifically mentioned above could be used in forming the hub structure. It will be understood that while the hub is described as mounting a fan spider 14, it could also mount any driven member such as the back plate of a centrifugal blower wheel or the center support of a double-inlet blower wheel. The hub is adapted to be accommodated within a generally star-shaped aperture 16 in the fan spider with the abutments 12a on the arms 12 engaging one face of the spider. The opposite face of the fan spider 14 is engaged by the abutment 13a of each of the legs 13, the legs 13 being positioned so that their spider engaging abutments are disposed between the apices of the aperture 16. The fan spider 14 may be snapped on the hub by moving it rightwardly along the inclined surface 13b of the legs 13, as viewed in FIG. 3. During this rightward insertion of the fan spider upon the hub the legs 13 will be deformed radially inwardly as indicated in broken lines in FIG. 3 and when the spider clears the abutment 13a the legs 13 will snap upwardly into their broken line position of FIG. 3 and will clamp the fan spider 14 against the abutment surfaces 12a of the arms 12.

The backdraft on the abutment surface 13a permits fan spiders of varying thickness to be accommodated by the hub. Both the arms 12 and the legs 13 are formed so as to be constantly stressed along their length when subjected to a deforming force. The extension of the arms 12 into the apices of the aperture 16 permits the curved side margins 16a of the aperture to act as a snubbing surface limiting the sideward deformation of the arms 12 when overloaded. The fingers 13 can flex somewhat radially inwardly or outwardly as the fan is operated so as to compensate for any dynamic unbalance of the fan by allowing the fan to rotate slightly about its center in a plane through the axis of rotation of the shaft 11. Because the hub permits the fan spider to be snapped on at the point of installation, the fan device need not be shipped or stored in completely assembled condition. The somewhat resilient arms 12 and the radially resilient legs 13 can flex in a plane normal to the axis of rotation and thus can transform torsional vibration energy from the drive shaft into internal frictional heat within the flexing members which is dissipated into the surrounding air, the hub thus providing the necessary damping for isolating the fan blades with respect to torsional vibration of the drive shaft.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. A resilient hub and fan spider assembly comprising a fan spider, the fan spider having a central generally star-shaped aperture therein, said assembly further including a hub comprising a sleeve adapted to accommodate a drive shaft and to be rotationally locked to the drive shaft, a plurality of symmetrically spaced arms extending radially from said sleeve and adapted to extend into the apices of the spider aperture, said arms varying in cross-section along their length so as to be uniformly stressed when deflected in a plane transverse to the axis of rotation of the sleeve and having abutments at their outer ends adapted to engage one side face of the fan spider, and a plurality of legs extending from said sleeve at an acute angle thereto and having a diminishing cross-sectional area from their junction with said sleeve toward their free ends thereby being uniformly stressed along a substantial portion of their length when subjected to a radially inward force, an abutment adjacent the free end of each of said legs opposing said arm abutments, said leg abutments being adapted to engage the other face of said spider between the apices of said spider aperture and to clamp said fan spider against said arm abutments.

2. A resilient hub as claimed in claim 1 in which the sleeve, arms and legs are integrally formed of a substance having appreciable internal friction.

3. A resilient hub as claimed in claim 1 in which the abutment at the free end of each of said legs is undercut so that said hub can accommodate fan spiders of varying thickness.

4. A resilient hub and fan spider assembly comprising a fan spider, the fan spider having a central generally star-shaped aperture therein, said assembly further including a hub comprising a sleeve adapted to accommodate a drive shaft and to be rotationally locked to the drive shaft, a plurality of symmetrically spaced arms extending from said sleeve and adapted to extend into the apices of the spider aperture, said arms varying in cross-section along their length so as to be uniformly stressed when deflected in a direction transverse to the axis of rotation of said sleeve and having their outer ends adapted to engage the fan spider, and a plurality of legs extending from said sleeve at an acute angle thereto and having a diminishing cross-sectional area from their junction with said sleeve toward their free ends thereby being uniformly stressed along a substantial portion of their length when subjected to a radially inward force, said legs being adapted to engage said spider between the apices of said spider aperture.

5. A resilient hub for mounting a support member for an air moving means on a drive shaft, said hub comprising a sleeve adapted to accommodate a drive shaft and to be rotationally locked to the drive shaft, a series of equally spaced arms extending from said sleeve having abutments at their outer ends adapted to engage one side face of the support member, and a plurality of legs extending from said sleeve and having a diminishing cross-sectional area from their junction with said sleeve toward their free ends thereby being uniformly stressed along a substantial portion of their length when subjected to a radially inward force, an abutment adjacent the free end of each of said legs opposing said arm abutments, said leg abutments being adapted to engage the other face of said support member and to clamp said support member against said arm abutments with the support member spaced a substantial distance axially from the said junction of the legs with said sleeve.

6. A resilient hub for mounting a driven member on a rotatable drive member, said hub comprising an element adapted to be rotationally locked to the drive member, a plurality of symmetrically spaced beam members extending from said element and adapted to engage said driven member at points spaced substantially in an axial direction from the junction of said beam members and said element, said beam members being flexible and varying in cross-section along their length so as to be uniformly stressed when subjected to forces generated by torsional vibration of either of said members.

References Cited

UNITED STATES PATENTS 3,084,963   4/1963   Beehler _____ 170—160.54 X
3,243,206   3/1966   Samer _____ 285—162

EVERETTE A. POWELL, JR., *Primary Examiner.*